UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

HARD-RUBBER COMPOSITION.

1,200,692. Specification of Letters Patent. Patented Oct. 10, 1916.

No Drawing. Application filed June 16, 1910. Serial No. 567,222.

*To all whom it may concern:*

Be it known that I, LEO H. BAEKELAND, a citizen of the United States, residing at Yonkers, in the county of Westchester and State of New York, have invented certain new and useful Improvements in Hard-Rubber Compositions, of which the following is a specification.

It is a well known fact among hard rubber manufacturers that in order to obtain good hard rubber compositions which may easily acquire a good polish there are special precautions which must be taken. Ordinary filling materials such as are used for soft rubber goods cannot well be used. The addition of resinous matters such as shellac, copal, etc., is excluded, not only because goods containing such resinous additions lose the capacity of taking an easy polish, but because they are far more sensitive to the action of heat. For that reason, if for no other, the manufacturers of high grade hard rubber goods prefer to use as a filling material finely ground hard rubber itself.

The present invention relates to hard rubber compositions and processes for making the same, the object of the invention being the preparation of hard rubber compositions or goods which are capable of acquiring a polish, and which at the same time are more resistant to heat, solvents, and chemical and physical influences than ordinary hard rubber. For this purpose, I prepare a composition which in addition to rubber contains a certain proportion of infusible condensation products of phenols and formaldehyde. To these may be added in various proportions, as far as is warranted by the conditions, suitable filling materials, rubber substitutes, etc., as is generally practised in the manufacture of rubber goods.

The present process has the further advantage that under certain conditions it is possible to use so-called reclaimed rubber. The simplest mode of carrying out the process is as follows: To the rubber composition compounded in any usual or desired manner is added a suitable proportion, for example about an equal amount by weight of the insoluble, infusible condensation product of phenols and formaldehyde, preliminarily reduced to a very fine powder. The mixing is done in accordance with the usual methods used in rubber manufacture, and the mixture is molded and vulcanized as usual for the preparation of the articles.

It is rather difficult to pulverize the final infusible, insoluble condensation products of phenols and formaldehyde by reason of their extreme hardness; it is therefore more advantageous in practice not to use the very hardest material, but to employ instead an intermediate product of condensation, which although solid when cooled softens slightly when heated without entering into fusion, and is relatively brittle at ordinary temperatures, and for that reason can easily be ground and reduced to very fine powder. This powder is incorporated with the rubber mass as above described, and the mass then submitted to vulcanization, during which process the heat will transform the intermediate condensation product into the very hard final condensation product.

Another manner of carrying out the invention is as follows: The condensation product of phenols and formaldehyde, either in its intermediate or in its final state of condensation, is finely pulverized, and this powder is thoroughly mixed with pulverized vulcanized rubber. The pulverulent mixture is now pressed in very hot molds until the particles cement together, after which the articles are released from the mold and if necessary submitted to further hardening by longer application of heat, with or without pressure, without the necessity of using a mold.

Instead of using infusible condensation products in their final state, the process may be so modified as to form such products in the rubber from the initial products which are capable of engendering them. For example, a mixture of about one volume of phenol or its homologues, cresol, etc., with about one volume of a commercial solution of formaldehyde, may be boiled, or made to react by means of suitable catalytic or condensing agents, until the mass separates into two layers, the one heavier and viscous or oily, and the other a supernatant layer consisting chiefly of water and some water-soluble substances. The liquid may be evaporated in order to eliminate the water contained in the upper layer, or the oily or viscous liquid may be withdrawn for further use. The above chemical reaction works especially well in presence of small proportions of bases, as for example about five per cent. of aqueous ammonia.

In whatever way the condensation product has been obtained, it can now be directly mixed with or incorporated in the rubber mass; or if preferred the condensation product may be submitted to further heating, whereby it may be thickened even to the point where the mass, on cooling, sets to a brittle solid, which on further heating can be transformed into the final infusible product, or into an intermediate state as above described. Whether the product prepared as above indicated be oily, viscous, pasty or solid at ordinary temperatures, it is suitable for use in the process by mixing with rubber. The operation is facilitated by the employment of heat during the mixing process.

A decided solvent or swelling action which the liquid, oily or pasty products exercise on rubber renders the incorporation with rubber, or with a mixture of rubber and sulfur or other filling materials, very easy, so that a plastic mass is readily obtained which can be submitted to the ordinary molding and vulcanizing operations as practised in the rubber industry.

Instead of using new rubber, very satisfactory results are obtained with vulcanized rubber or so-called reclaimed rubber, or old rubber, all of which are easily incorporated with the initial products of condensation.

The mixture is preferably prepared by means of heated rollers. A suitable proportion of sulfur may be incorporated with the heated mass, and the whole submitted to molding and to the action of heat or of heat and pressure.

A further modification of the process consists in mixing the mass in hot mixing devices, as for example heated rollers, until it becomes more pasty in consistence and until, on cooling, it sets to a substance which can be ground or pulverized. The mass is then cooled, comminuted, and the powder pressed in hot holds, as above described, into the form of the desired articles.

However the process is conducted, it may be aided to a certain extent by the addition of so-called catalytic agents, or condensing agents, as for example by the addition of small proportions of alkalis, bases, salts or acids. I have also found that it is of considerable advantage that during or after the mixing process the mass should be dried in order to expel any water or other disturbing volatile matters.

In the above specification and in the claims the term "phenols" is used to designate either true phenol or its homologues, as cresol, xylenol, etc., or mixtures of these products. The term "formaldehyde" is intended to include formaldehyde, its polymers, and such substances as are capable of engendering formaldehyde and which are in this process chemically equivalent thereto. The expression "condensation product of phenols and formaldehyde" as employed in the claims is intended to cover either the final infusible condensation product, or such partial condensation products, whether initial or intermediate, as are capable of transformation into said final product.

I claim:

1. A hard rubber composition containing an infusible condensation product of phenols and formaldehyde, rubber and sulfur.

2. A hard rubber composition containing an infusible condensation product of phenols and formaldehyde, rubber, sulfur and suitable filling materials.

3. A plastic rubber composition containing vulcanized rubber and a condensation product of phenols and formaldehyde, said composition adapted for transformation by heat into a hard rubber composition.

4. A plastic rubber composition containing vulcanized rubber, sulfur and a condensation product of phenols and formaldehyde, said composition adapted for transformation by heat into a hard rubber composition.

In testimony whereof, I affix my signature in presence of two witnesses.

LEO H. BAEKELAND.

Witnesses:
R. H. WILLIAMS,
GEO. D. KLIPPEL.

It is hereby certified that in Letters Patent No. 1,200,692, granted October 10, 1916, upon the application of Leo H. Baekeland, of Yonkers, New York, for an improvement in "Hard-Rubber Compositions," errors appear in the printed specification requiring correction as follows: Page 2, line 47, for the word "holds" read *molds;* same page, lines 80–81, claim 2, for the word "phenals" read *phenols;* and that the said Letters Patent should be read with these corrections therein that the same may conform to the record of the case in the Patent Office.

Signed and sealed this 31st day of October, A. D., 1916.

[SEAL.]                                             R. F. WHITEHEAD,

Cl.106—22.                              *Acting Commissioner of Patents.*